J. BACHELDER.
Hay Loader.
No. 100,710.
2 Sheets—Sheet 1.
Patented March 15, 1870.
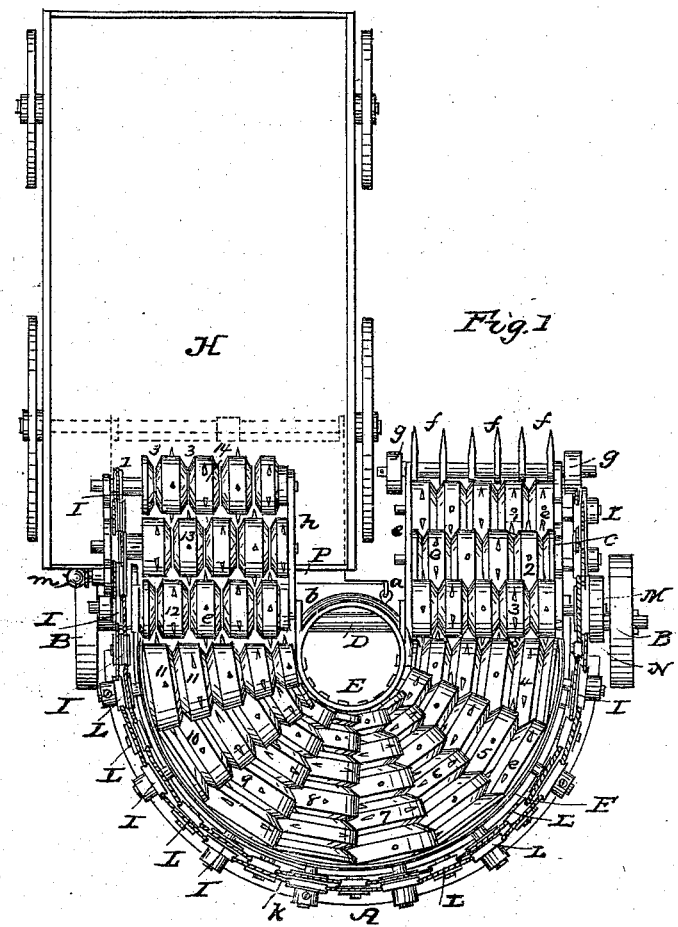
WITNESSES
L. E. Hill
W. B. Johnson.
INVENTOR
John Bachelder J. BACHELDER.
Hay Loader.

Patented March 15, 1870.

WITNESSES
L. E. Hill
W. B. Johnson.

INVENTOR
John Bachelder

United States Patent Office.

JOHN BACHELDER, OF NORWICH, CONNECTICUT.

Letters Patent No. 100,710, dated March 15, 1870.

HAY-LOADER

The Schedule referred to in these Letters Patent and making part of the same.

*To all whom it may concern:*

Be it known that I, JOHN BACHELDER, of Norwich, in the county of New London, and State of Connecticut, have invented certain new and useful Improvements in Hay-Loading Machines; and I do hereby declare that the following is a full, clear, and exact description of the same, reference being had to the accompanying drawings, forming a part of this specification, and in which—

Figure 1 represents a plan view of my improved hay-loading machine;

Figure 3:
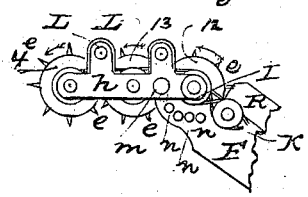
Figure 3 represents a side view of the adjusting-device at the upper end of the roll-way.
Figure 2:
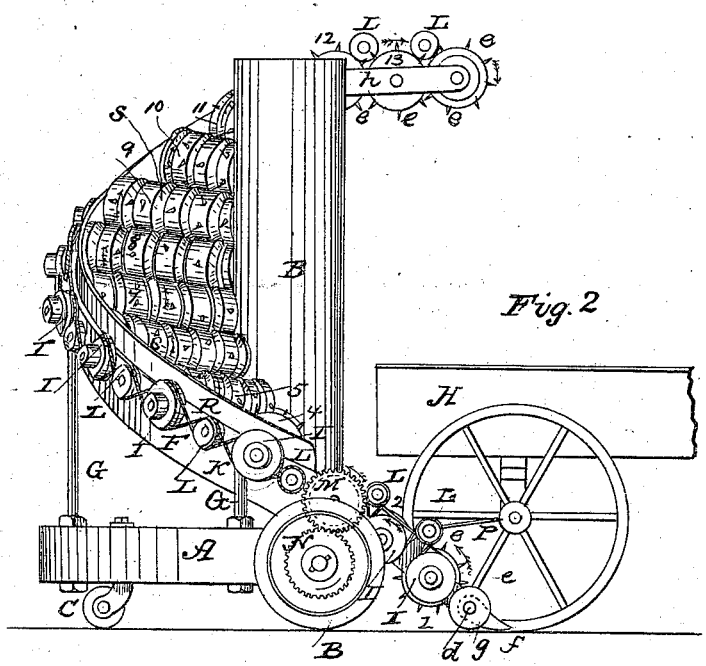
Figure 2 represents a side view of the same.

To enable those skilled in the art to which my invention belongs to make and use the same, I will proceed to describe it more in detail.

The nature of my invention consists—

First, in the combination with a raking or collecting device of a series of transferring-rolls, as hereinafter set forth.

Secondly, in the combination with the transferring-rolls of a central supporting column, as hereafter described.

Thirdly, in the combination with the frame which supports the transferring-rolls of the supporting and driving-wheels, as hereafter explained.

Fourthly, in the combination with the main part of the transferring roll-way of an adjustable collecting section, as hereinafter explained.

Fifthly, in the combination with the main part of the transferring roll-way of an adjustable delivering section, as hereafter explained.

In the drawings—

The part marked A is the bed-frame of the machine, which is mounted upon two traveling wheels, B B, and one trail or caster-wheel, C.

The bed-frame A is semicircular in form and arranged with the circled part toward the rear and the straight part forward.

A shaft, D, is arranged along the straight part of the frame A, upon which it is supported by suitable bearings.

Said shaft D extends from side to side of the machine, and upon its ends are secured the traveling wheels B B, the left-hand wheel being rigidly secured to the shaft D, whereby the latter is caused to revolve as the machine moves forward, while the right-hand wheel is hung loosely thereon, so as to facilitate the turning of the machine.

The trail-wheel C is arranged as a support beneath the circular rear part of the bed-frame A, where it operates in the same manner as any ordinary caster.

Projecting upward from the center of the bed-frame A is a cylindrical column, E, made of metal, and formed hollow to combine strength with lightness.

This column forms the central support of a roll-way consisting of a series of transferring-rolls, indicated in the drawings by numbers from 1 to 14, armed with spurs or teeth, e, and arranged for transferring the hay from the ground to the load.

The roll-way is formed in three sections: the first of which, or collecting section, is straight, the second or main part, spiral, and the third, or delivering section, is straight like the first.

The outer ends of the rolls in the second section are supported by a spiral band or frame, F, arranged upon studs, G, that project up from the bed-frame A.

The frames of the first and third sections are supported on the end of the spiral frame F and by lugs *a* and *b*, that project forward from the upper and lower ends of the cylindrical center column.

The first section of the roll-way is at the right-hand side of the machine and at the lower end of the spiral. It consists of two side pieces, *c c*, the rear ends of which are pivoted upon the shaft of roll 3, one end of which is supported by the lug *a* on the lower end of the column E, and the other by the lower end of the spiral frame F, suitable bearings being arranged in each.

The side pieces *c c* extend forward and downward, and are joined to each other at their front ends by a finger-bar, *d*, which latter is provided with fingers, *f*, for collecting the hay.

Small gauge-wheels, *g*, are arranged at each end of the finger-bar J, which keep it raised a short distance from the ground.

The fingers *f* are hung loosely upon the bar *d*, so that they may adjust themselves to the unevenness of the ground over which they pass, and they are made somewhat curved at their under sides so that they will run freely along the surface as the machine is moved forward.

The rolls 1 and 2 are hung between the side pieces *c c* in rear of the finger-bar *d*, as shown in the drawings, suitable bearings being formed in said side pieces for the reception of their journals.

The forward end of this section can rise and fall to conform to the uneven surface of the ground, the shaft of roll 3 acting as a pivot, while it can be folded back when not in use, or when passing to and from the field.

The second or spiral section contains the rolls 4, 5, 6, 7, 8, 9, 10, and 11. These rolls are all of conical form, and are arranged in an ascending spiral curve around the column E, as shown in the drawings, the journals at their outer ends being supported in bearings on the rim F, and those at their inner end in bearings formed in the column E.

The third or discharging section comprises the three last rolls of the series.

The side pieces *h* are hung upon the journals of roll 12, which latter are supported by bearings at the top end of the rim F and in the lug *b* at the top end of the column E.

The rolls 13 and 14 are journaled in the side pieces *h*, which pieces project forward over the wagon H, upon which the hay is to be loaded, as shown in the drawings.

The section can be swung up or down on the journal of roll 12 as a pivot, and it may be adjusted and held in any desired position, by means of a spring-bolt, *m*, arranged in the left-hand side piece *h*, and the point of which fits into one of the holes or depressions *n* formed in the side of the rim F at its upper end.

Each transferring-roll is provided with a driving-pulley, I, attached to the end of its outer journal.

The size of these pulleys is gradually decreased throughout the series of rolls, the pulley of roll 1 being the largest and that of roll 14 the smallest, so that the velocity of each succeeding roll is accelerated.

A belt, K, connects all of the pulleys I for motion, intermediate pulleys, L, being arranged between each of the others to give the belt the proper direction.

The motion is transmitted to the different pulleys and rolls by the belt K from the pulley on the shaft of roll 3; this shaft being driven by a gear, M, that meshes into a gear, N, on the wheel-shaft D, and as the machine moves forward all of the rolls are turned in the same direction, indicated in the drawings by arrows, so that the hay will be passed from one to another in an upward direction.

Grooves, *s*, are formed around the rolls to allow free passage to the teeth *e* upon the rolls next adjoining.

The machine is attached to the rear axle of the wagon H by means of a rectangular sheet metal connecting-piece P, having hooks at each of its corners, two of which hook into loop bolts secured in the front of the bed-frame A, and the other two over the rear axle of the wagon. It may be attached, however, in any other suitable manner, if preferred.

The relative positions of the machine and wagon are such that the discharging-roll 14 will be directly over the rear part of the wagon H in either of its adjusted positions, and the finger-bar *d* will rest upon the ground at the right of the rear wheel of said wagon, as shown in the drawings.

A guard-plate, R, is arranged along the top of the rim F to prevent the hay from being thrown from the rolls.

The operation is as follows:

The machine being attached to the wagon, the finger-bar placed in the position shown, and the discharging-roll 14 elevated to the desired position, as the machine is drawn forward the rolls are operated as before stated, and the hay is collected and gradually raised by the fingers *f* until it is caught up on the teeth *e* of the roll 1, which immediately transfers it to roll 2, and by roll 2 it is carried to roll 3, and thence to roll 4, and in like manner throughout the whole series of rolls until it has reached the roll 14, from which it falls into the wagon H.

In lieu of the pulleys I and L spur-wheels or gears may be used for transmitting the motion to the rolls, and they may, if preferred, be arranged at the inner side of the rim F.

Having described my improved hay-loading machine,

What I claim therein as new and of my invention, and desire to secure by Letters Patent, is—

1. The combination with the series of transferring-rolls of the raking and collecting devices, substantially as and for the purposes set forth.

2. The combination with the transferring-rolls of a central supporting column, substantially as and for the purposes set forth.

3. The combination and relative arrangement with the frame which supports the transferring-rolls of the driving and supporting-wheels, substantially as described.

4. The combination with the main part of the transferring roll-way of an adjustable collecting section, substantially as described.

5. The combination with the main part of the transferring roll-way of an adjustable delivering section, substantially as described.

JOHN BACHELDER.

Witnesses:
L. E. HILL,
W. B. JOHNSON.